(12) United States Patent
Mecuson et al.

(10) Patent No.: US 9,261,008 B2
(45) Date of Patent: Feb. 16, 2016

(54) EXHAUST WITH AN ACOUSTIC ATTENUATION SYSTEM

(71) Applicant: HERAKLES, Le Haillan (FR)

(72) Inventors: Gautier Mecuson, Bordeaux (FR); Eric Conete, Merignac (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 14/379,342

(22) PCT Filed: Feb. 15, 2013

(86) PCT No.: PCT/FR2013/050311
§ 371 (c)(1),
(2) Date: Aug. 18, 2014

(87) PCT Pub. No.: WO2013/121155
PCT Pub. Date: Aug. 22, 2013

(65) Prior Publication Data
US 2015/0034412 A1 Feb. 5, 2015

(30) Foreign Application Priority Data
Feb. 17, 2012 (FR) ..................................... 12 51472

(51) Int. Cl.
| | | |
|---|---|---|
| *F02K 1/82* | (2006.01) | |
| *B64D 33/02* | (2006.01) | |
| *F01N 13/08* | (2010.01) | |
| *F01D 25/30* | (2006.01) | |
| *F02C 7/24* | (2006.01) | |
| *F02K 1/04* | (2006.01) | |
| *F02K 1/00* | (2006.01) | |
| *B64D 33/00* | (2006.01) | |

(52) U.S. Cl.
CPC ................ *F01N 13/08* (2013.01); *F01D 25/30* (2013.01); *F02C 7/24* (2013.01); *F02K 1/04* (2013.01); *F02K 1/827* (2013.01); *F05D 2260/963* (2013.01); *F05D 2300/603* (2013.01); *Y02T 50/672* (2013.01)

(58) Field of Classification Search
USPC ................... 181/214, 213; 244/53 B, 1 N, 58
See application file for complete search history.

(56) References Cited

U.S. PATENT DOCUMENTS

| | | | | | |
|---|---|---|---|---|---|
| 938,101 | A | * | 10/1909 | Winters | .......................... 181/264 |
| 2,988,302 | A | * | 6/1961 | Smith | .............................. 244/15 |

(Continued)

FOREIGN PATENT DOCUMENTS

| | | |
|---|---|---|
| EP | 1391597 A2 | 2/2004 |
| EP | 1843032 A1 | 10/2007 |

(Continued)

OTHER PUBLICATIONS

International Search Report from corresponding International PCT Application No. PCT/FR2013/050311, Jul. 9, 2013.

*Primary Examiner* — Edgardo San Martin
(74) *Attorney, Agent, or Firm* — Workman Nydegger

(57) ABSTRACT

An aeroengine exhaust cone is arranged to extend from upstream to downstream along a longitudinal axis. The cone comprises a structural core of composite material made up of an axisymmetric part having an upstream endpiece at its upstream end and a downstream endpiece at its downstream end. The core provides structural strength to the cone. The cone has an acoustic attenuation system made of composite material and fastened on the structural core.

9 Claims, 3 Drawing Sheets

(56) References Cited

U.S. PATENT DOCUMENTS

| | | | |
|---|---|---|---|
| 4,064,961 A * | 12/1977 | Tseo | 181/213 |
| 4,137,992 A * | 2/1979 | Herman | 181/213 |
| 4,240,519 A * | 12/1980 | Wynosky | 181/213 |
| 5,246,736 A | 9/1993 | Goujard et al. | |
| 5,594,216 A | 1/1997 | Yasukawa et al. | |
| 5,759,688 A * | 6/1998 | Lee et al. | 428/408 |
| 5,965,266 A | 10/1999 | Goujard et al. | |
| 6,068,930 A | 5/2000 | Lamouroux et al. | |
| 6,291,058 B1 | 9/2001 | Goujard et al. | |
| 6,935,834 B2 * | 8/2005 | Lata Perez | 415/115 |
| 7,784,283 B2 * | 8/2010 | Yu et al. | 60/770 |
| 7,891,195 B2 | 2/2011 | Bouty et al. | |
| 8,025,122 B2 * | 9/2011 | Gilcreest et al. | 181/213 |
| 8,584,356 B2 * | 11/2013 | Philippe et al. | 29/889.21 |
| 8,776,946 B2 * | 7/2014 | Todorovic | 181/213 |
| 2004/0076512 A1 * | 4/2004 | Lata Perez | 415/119 |
| 2006/0207826 A1 | 9/2006 | Williams | |
| 2007/0220894 A1 | 9/2007 | Bouty et al. | |
| 2009/0263627 A1 | 10/2009 | Hand et al. | |
| 2011/0311368 A1 | 12/2011 | Coupe et al. | |
| 2012/0301691 A1 | 11/2012 | Charleux et al. | |

FOREIGN PATENT DOCUMENTS

| | | |
|---|---|---|
| FR | 2401888 A1 | 3/1979 |
| FR | 2952052 A1 | 5/2011 |
| WO | 2010/061140 A1 | 6/2010 |

* cited by examiner

EXHAUST WITH AN ACOUSTIC ATTENUATION SYSTEM

BACKGROUND OF THE INVENTION

The present invention relates to the exhaust cones used in the afterbodies of aeroengines.

In order to reduce noise in the flow ducts around the exhaust cones of aeroengines, it is known to provide a portion of the surface of such a cone with acoustic attenuation panels. Such panels are typically constituted both by a skin or a wall having a multiply-perforated surface that is permeable to the sound waves that are to be attenuated and also by a solid reflecting wall, with boxes or a cellular body, such as a honeycomb, being arranged between those two walls. In well known manner, such panels form Helmholtz type resonators that serve to attenuate the sound waves produced in the duct over a certain frequency range.

The component elements of such a panel are generally made of metal. The partitions of the boxes or of the cellular body are generally connected to the walls by brazing, and they contribute to the structural strength of the part on which they are mounted.

Nevertheless, that type of acoustic attenuation system presents several drawbacks. Firstly it increases the overall weight of the exhaust cone, which is penalizing in the field of aviation where saving weight is a constant concern.

Also, that type of system is relatively difficult to fabricate, in particular when it comes to assembling and centering multiply-perforated metal skins on the axisymmetric structure of the cone.

Furthermore, because of the large coefficients of expansion of metal materials, the multiply-perforated skins need to be mechanically decoupled from the internal carrier structure of the cone, thereby causing the acoustic attenuation system to be more complicated to make.

OBJECT AND SUMMARY OF THE INVENTION

An object of the present invention is to propose a novel design of exhaust cone suitable for performing an acoustic attenuation function, and to do so without penalizing the overall weight of the cone and without requiring component elements of the acoustic attenuation system to be decoupled from the remainder of the structure.

For this purpose, the exhaust cone of the present invention comprises a structural core of composite material made up of an axisymmetric part having an upstream endpiece at its upstream end and a downstream endpiece at its downstream end, said core providing the structural strength of the cone, said cone further comprising an acoustic attenuation system made of composite material and fastened on the structural core; the exhaust cone being characterized in that the acoustic attenuation system comprises longitudinal partitions of composite material fastened to the upstream and downstream endpieces by connection means that are mechanical, and transverse partitions of composite material fastened to the longitudinal partitions by connection means that are mechanical, said longitudinal and transverse partitions defining resonator boxes.

Thus, by providing the exhaust cone with a structural core of composite material of the invention, it is possible to incorporate in the exhaust cone an acoustic attenuation system that is likewise made of composite material, and that therefore has no need to be decoupled from the core. Specifically, in the absence of differential thermal expansion between the acoustic attenuation system and of the core, the component parts of these two assemblies can be connected together mechanically, thereby greatly simplifying incorporating an acoustic attenuation system, while also reducing the overall weight of the exhaust cone.

Also, by using a structural core that forms a self-supporting structure, the acoustic attenuation system has no need to have structural characteristics. Consequently, the acoustic attenuation system can be made with parts that are very thin, thereby enabling the overall weight of the exhaust cone to be lightened even more.

Furthermore, resonator boxes are formed on the structural core by longitudinal and transverse partitions mounted respectively on the endpieces of the core and on the longitudinal partitions by connection means that are mechanical, thereby simplifying the provision of the resonator boxes, since mounting partitions with connection means that are mechanical enables shapes to be adjusted and increases tolerance between the parts for assembling together in comparison with an assembly that is made by using adhesive, which requires the parts to be accurately fitted to one another and requires there to be no gaps between them in order to obtain connections that are reliable.

According to a particular characteristic of the invention, the longitudinal partitions are fastened respectively to the upstream and downstream endpieces by connection means that are mechanical and reversible, and the transverse partitions are fastened to the longitudinal partitions by connection means that are mechanical and reversible so as to form an assembly that can be dismantled. Under such circumstances, it is easy during maintenance operations for the partitions forming the resonator boxes to be removed and replaced in the event of wear or damage. Such repairability cannot be obtained when assembly is performed by means of adhesive, since the acoustic attenuation system must then be replaced in full even if only a small number of its parts need to be replaced.

According to another particular characteristic of the invention, the structural core is made of composite material comprising fiber reinforcement made of refractory fibers densified by a matrix that is at least partially made of ceramic. Under such circumstances, the structural core may in particular be made of composite material comprising fiber reinforcement made of silicon carbide fibers densified by a silicon carbide matrix including one or more self-healing phases.

According to another characteristic of the invention, the acoustic attenuation system includes longitudinal and transverse partitions made of composite material that are fastened to the structural core, said partitions defining resonator boxes. Since the partitions do not have any structural role, they may be made with relatively small thickness lying in the range 0.7 millimeters (mm) to 1.5 mm.

According to yet another characteristic of the invention, the acoustic attenuation system further comprises a multiply-perforated skin of composite material fastened between the upstream endpiece and the downstream endpiece of the core, said multiply-perforated skin closing the top portions of the resonator boxes. As for the partitions, since the multiply-perforated skin does not have any structural function, it may have thickness that is relatively small, lying in the range 0.7 mm to 1.5 mm.

The invention also provides an aeroengine afterbody including an exhaust cone of the invention.

BRIEF DESCRIPTION OF THE DRAWINGS

Other characteristics and advantages of the invention appear from the following description of particular embodiments of the invention, given as nonlimiting examples and with reference to the accompanying drawings, in which.

DETAILED DESCRIPTION OF EMBODIMENTS

A particular but nonexclusive field of application of the invention is that of exhaust cones for aeroengines such as those used in airplanes or helicopters.

Figure 1:
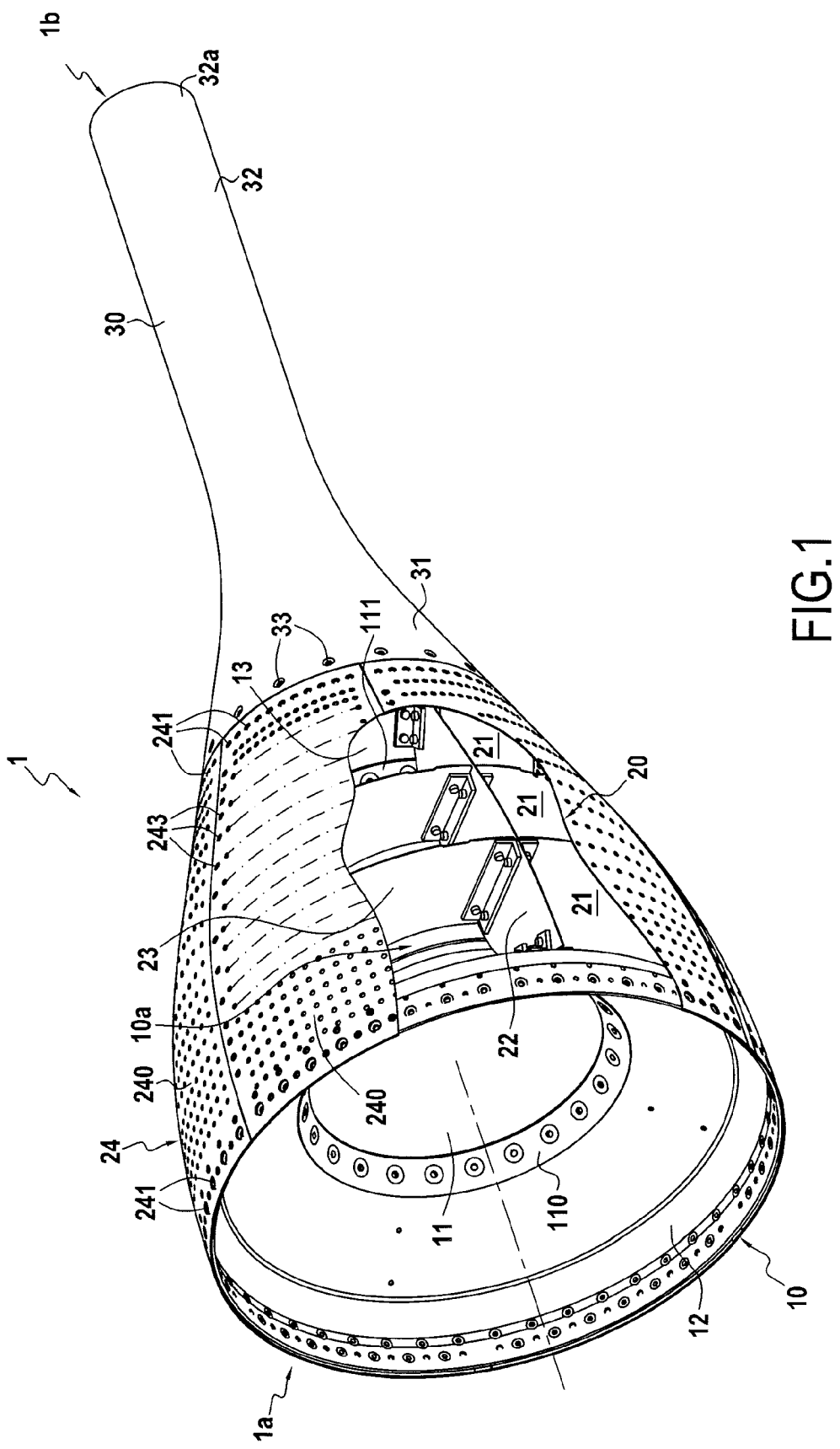
FIG. 1 is a diagrammatic perspective view showing an exhaust cone in accordance with an embodiment of the invention.
Figure 2:
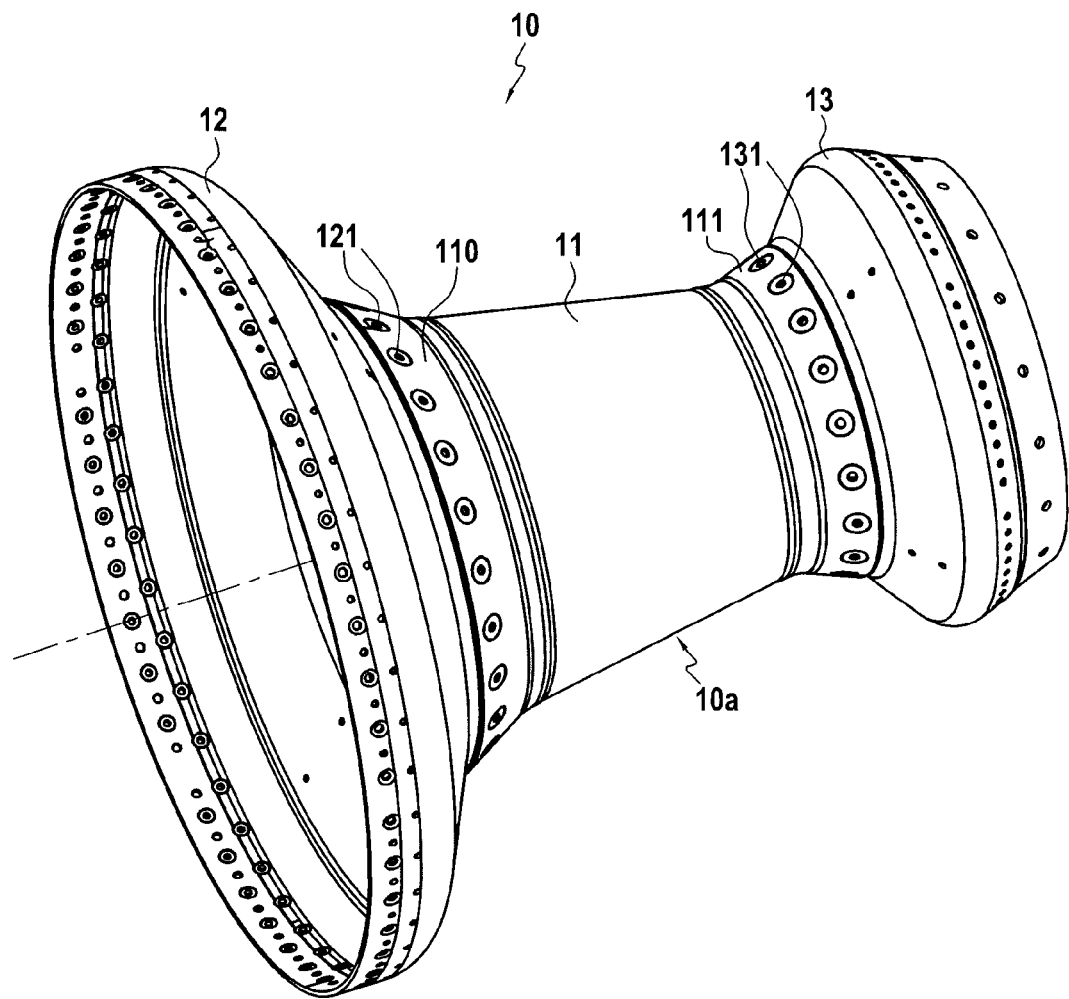
FIG. 2 is a diagrammatic perspective view of the structural core of the FIG. 1 exhaust cone.

FIG. 1 shows an exhaust cone 1 in accordance with an embodiment of the invention. The exhaust cone 1 comprises a core 10 constituted by an axisymmetric part 11 that presents an upstream end 110 and a downstream end 111 of flared shape, the ends having fastened thereto respectively an upstream endpiece 12 and a downstream endpiece 13 (FIG. 2). An acoustic attenuation system 20 is mounted on the core 10. The acoustic attenuation system 20 comprises a plurality of resonator boxes 21. The bottoms of the resonator boxes 21 are defined by the outer wall 10a of the core 10. The side walls of the boxes are defined by longitudinal partitions 22 and by transverse partitions 23. The resonator boxes 21 are closed by a multiply-perforated skin 24 forming the outer wall of the exhaust cone around the core 10. The resonator boxes 21 absorb a maximum amount of energy around their resonant frequency, which is determined as a function of the dimensions of the Helmholtz type boxes, and they serve over a certain frequency range to attenuate the soundwaves produced in the duct defined between the exhaust cone 1 and the exhaust nozzle (not shown in FIG. 1).

The exhaust cone also has a terminal portion 30 formed by a frustoconical part presenting a first portion 31 of flared shape that is fastened to the downstream endpiece 13 and that is extended by a tubular portion 32 having its free end 32a corresponding to the downstream end 1b of the exhaust cone 1. The cone also has a fastener flange of metal material (not shown in FIG. 1), e.g. made of Inconel® 718, enabling the upstream end 1a of the cone 1 to be fastened to the exhaust casing of the engine (not shown in FIG. 1). The fastener flange is fastened to the upstream endpiece via resilient fastener tabs in order to compensate for the differential expansions between the material of the fastener flange and the material of the upstream endpiece.

In accordance with the invention, the core 10 is made of thermostructural composite material, i.e. of a material that is suitable for forming structural parts that present good mechanical characteristics and that are suitable for conserving these characteristics at high temperature. In other words, the thermostructural composite material confers sufficient mechanical strength to the component parts of the core for it to be self-supporting, i.e. for it to withstand the forces to which the cone is subjected and also to support other elements of the cone that are not structural, such as an acoustic attenuation system as described below. In order to perform their structural function, the parts constituting the core are made with thicknesses that are sufficient to provide this function. By way of example, for an exhaust cone having a total length of about 180 centimeters (cm), and a diameter at its portion for connection to the exhaust casing lying in the range 600 mm to 800 mm, the component parts of the core 10 are made of ceramic matrix composite (CMC) material, the axisymmetric part presenting thickness lying in the range 1 mm to 3 mm, while the endpieces present thickness lying in the range 2 mm to 5 mm.

The axisymmetric part 11 and the endpieces 12 and 13 are made in particular out of a carbon/carbon (C/C) composite material, which in known manner is a material made of carbon fiber reinforcement densified by a matrix made of carbon, or of CMC composite material, which in known manner is a material formed by carbon or ceramic fiber reinforcement densified by a matrix that is ceramic, at least in part. Thermostructural composite materials, such as C/C or CMC materials, are characterized by their good mechanical properties that make them suitable for constituting structural parts, and by their ability to retain these mechanical properties at high temperatures that may be greater than 1300° C. for a C/C or a CMC material. The axisymmetric part 10 and the endpieces 12 and 13 are preferably made of CMC material, such as the Cerasep® A40C material that is made of silicon carbide (SiC) fiber reinforcement and a self-healing ceramic matrix, e.g. made of SiC.

The fabrication of composite material parts, in particular parts made of C/C or CMC, is well-known. It generally comprises making a fiber preform and densifying the preform with the matrix. The fiber preform is of a shape similar to that of the part that is to be fabricated, and it is made of refractory fibers, i.e. ceramic fibers, e.g. made of silicon carbide (SiC), carbon fibers, or indeed fibers made of a refractory oxide, such as alumina ($Al_2O_3$), for example.

The fiber preform constitutes the reinforcement of the part and plays an essential role in terms of mechanical properties. The preform is obtained from fiber textures made of refractory fibers. The fiber textures used may be of a variety of natures and shapes, such as in particular:

two-dimensional (2D) woven fabrics;
three-dimensional (3D) woven fabrics obtained by 3D or multi-layer weaving, as described in particular in document WO 2010/061140, the content of which is incorporated herein by reference;
braids;
knits;
felts; and/or
unidirectional (UD) sheets of yarns or tows or multidirectional (nD) sheets obtained by superposing a plurality of UD sheets in different directions and bonding the UD sheets together, e.g. by stitching, by a chemical bonding agent, or by needling.

It is also possible to use a fiber structure made up of a plurality of superposed layers of woven fabrics, braids, knits, felts, sheets, tows, etc., which layers are bonded together by stitching, by implanting yarns or rigid elements, or by needling, for example Shaping is performed by winding filaments, winding a UD sheet on a mandrel, weaving, stacking, needling two-dimensional/three-dimensional plies or sheets of tows, etc.

Prior to densification, the fiber preform may be consolidated in order to give it sufficient mechanical strength to enable it to retain its shape while it is being handled.

With a C/C material, the fiber preform may be densified using a liquid technique, with the preform being impregnated with a precursor resin for the carbon matrix such as a phenolic type resin.

After being impregnated, the fiber preform that is to constitute the fiber reinforcement of the part that is to be made, and that has a shape corresponding substantially to the shape of that part, is put into its final shape with the help of support tooling. The resin(s) is/are then transformed by heat treatment (polymerization/carbonization). The operations of impregnation and of polymerization/carbonization may be repeated several times, if necessary, in order to obtain determined mechanical characteristics.

The fiber preform may also be densified, in known manner, by using a gaseous technique, involving chemical vapor infiltration (CVI) of the carbon matrix.

Densification combining a liquid technique and a gaseous technique is sometimes used in order to facilitate working, limit costs, and shorten fabrication cycles, while obtaining characteristics that are satisfactory for the intended use.

The CMC materials that can be used for making the axisymmetric part and the endpieces constituting the structural core of the cone of the invention are formed by fiber reinforcement made of carbon or ceramic fibers that have been densified with a matrix that is made, at least in part, of ceramic and in particular of carbide, nitride, refractory oxide, etc., such as for example:
- a carbon/carbon-silicon carbide (C/C—SiC) composite material, which is a material constituted by carbon fiber reinforcement that has been densified with a matrix comprising a carbon phase and a silicon carbide phase;
- a carbon/silicon carbide (C/SiC) composite material, which is a material constituted by carbon fiber reinforcement that has been densified with a silicon carbide matrix; and/or
- a silicon carbide/silicon carbide (SiC/SiC) composite material, which is a material constituted by silicon carbide fiber reinforcement that has been densified with a silicon carbide matrix.

With the C—C/SiC material, the first carbon phase of the matrix is the first phase to be deposited so as to be present as close as possible to the fibers and so as subsequently to be covered by the second phase made of SiC, thus making it possible to form an SIC oxidation protection layer on the first phase that is made of carbon.

When densifying using a liquid technique, the matrix (or its ceramic phase) is made of a ceramic-precursor resin, which may for example be a polycarbosilane resin that is a precursor for silicon carbide (SiC), or a polysiloxane resin that is a precursor for SiCO, or a polyborocarbosilazane resin that is a precursor for SiCNB, or a polysilazane resin (SiCN). With a C—C/SiC material, the fiber preform is initially impregnated with a precursor resin for the carbon phase of the matrix, such as a phenolic type resin.

When using a gaseous technique for densifying the matrix by chemical vapor infiltration (CVI), the matrix (or its ceramic phase) is made using a gaseous precursor for SiC, which, when making a C—SiC material, may for example be methyl trichlorosilane (MTS), giving SiC by decomposition of the MTS. When making a C—C/SiC material, the carbon first phase may be made using hydrocarbon gases such as methane and/or propane that give carbon by cracking, with the SiC second phase then being deposited on the carbon first phase, e.g. by decomposing MTS.

It is naturally possible to combine densifying using a liquid technique and densifying using a gaseous technique.

In the presently described example, the axially symmetric part 10 and the endpieces 12 and 13 are made individually out of CMC composite material of the Cerasep® A40C type. For each of these parts, a fiber texture is made initially out of SiC fibers. Once it has been made, the fiber texture is shaped and consolidated by being impregnated with a liquid composition containing a ceramic-precursor consolidation resin.

For this purpose, the fiber texture is immersed in a bath containing the resin and usually also containing a solvent for the resin. After being drained, the fiber texture is dried in a stove. The drying may be accompanied by pre-curing or partial curing of the resin. Since such pre-curing imparts additional stiffness, it must remain limited, if it is used at all, in order to conserve sufficient deformability for the fiber texture.

It is also possible to use other known impregnation techniques, such as preparing a pre-impregnated part by passing the fiber texture through a continuous impregnator, by impregnating by infusion, or indeed by impregnating by resin transfer molding (RTM).

The consolidation resin is selected so that, after pyrolysis, it leaves a ceramic residue that is sufficient to ensure consolidation of the subsequently-made fiber preform.

A ceramic precursor resin may for example be a polycarbosilane resin that is a precursor for silicon carbide (SiC), or a polysiloxane resin that is a precursor for SiCO, or a polyborocarbosilazane resin that is a precursor for SiCNB, or a polysilazane resin (SiCN).

After being impregnated, a fiber preform that is to constitute the fiber reinforcement of the part that is to be made, and that has a shape corresponding substantially to the shape of that part, is put into its final shape by shaping the fiber texture with the help of support tooling.

The shaping of the fiber preform is preferably accompanied by compacting the fiber structure so as to increase the volume density of fibers in the composite material of the part that is to be made.

After the preform has been shaped, the resin is cured while the preform is in tooling, or its curing is completed if there has already been some pre-curing.

Thereafter, consolidation is finished off by heat treatment for pyrolyzing the resin. By way of example, pyrolysis is performed at a temperature lying in the range about 900° C. to 1000° C.

Consolidation may also be performed by chemical vapor infiltration (CVI).

After this consolidation, densification of the fiber preform with a ceramic matrix is continued.

Densification is advantageously performed by chemical vapor infiltration (CVI), the parameters of the CVI process and the nature of the reaction gas being adapted to the nature of the matrix that is to be formed. It is thus possible in the same oven for the operations of pyrolyzing the resin, of consolidation, and of densification to be run on one after the other.

The ceramic matrix made by CVI is an SiC matrix that is at least partially self-healing, such as a silicon-boron-carbon (Si—B—C) matrix, or a boron carbide ($B_4C$) matrix, or indeed a sequenced matrix having alternating matrix phases of non-healing ceramic and of healing ceramic. Reference may be made in particular to the document FR 2 401 888, U.S. Pat. No. 5,246,736, U.S. Pat. No. 5,965,266, U.S. Pat. No. 6,068,930, and U.S. Pat. No. 6,291,058.

The ceramic matrix may be deposited in a plurality of successive infiltration cycles with a machining operation between each of the cycles for opening up the pores in the surface of the material so as to facilitate depositing the matrix within the fiber reinforcement.

As shown in FIG. 2, the axisymmetric part 11 and the upstream and downstream endpieces 12 and 13 made of CMC composite material are thus obtained. In the presently described example, the core 10 is obtained by mounting the upstream and downstream endpieces 12 and 13 respectively on the upstream and downstream ends 110 and 111 of the axisymmetric part 11 by means of bolted connections 121 and 131, as shown in FIG. 2. The endpieces may be fastened to the axisymmetric part by other means, such as brazing. Furthermore, the core 10 may also be made as a single part that directly incorporates the axisymmetric part together with the upstream and downstream endpieces.

Once the core 10 has been made, the acoustic attenuation system is mounted on the core 10. In accordance with the invention, the acoustic attenuation system is made by assembling longitudinal and transverse partitions using connection means that are mechanical such as nut-and-bolt type connections, rivets, etc, thereby obtaining considerable tolerance on assembly. Such mechanical connection means are preferably reversible, such as nut-and-bolt type systems, since they enable the acoustic attenuation system to be an assembly that can be dismantled, thereby imparting good repairability thereto, since only parts that are worn or damaged need to be replaced. In the event of the partitions of the acoustic attenuation system being assembled together by adhesive or by brazing, the parts for assembling together need to be very accurate in terms of shape and dimensions in order to enable the partitions to be assembled, since that type of assembly can accommodate very little or no dimensional variations between the parts that are to be assembled together. Consequently, when assembly is performed by means of adhesive or brazing, the complexity and the cost of performing assembly are greater than when assembly is performed by means of mechanical connection means. Also, when the partitions are assembled on the core by adhesive or brazing, replacing one or more damaged or worn partitions requires all of the partitions to be replaced, and consequently increases the cost of maintaining the acoustic attenuation system and increases the downtime of the engine having the exhaust cone.

Figure 3:
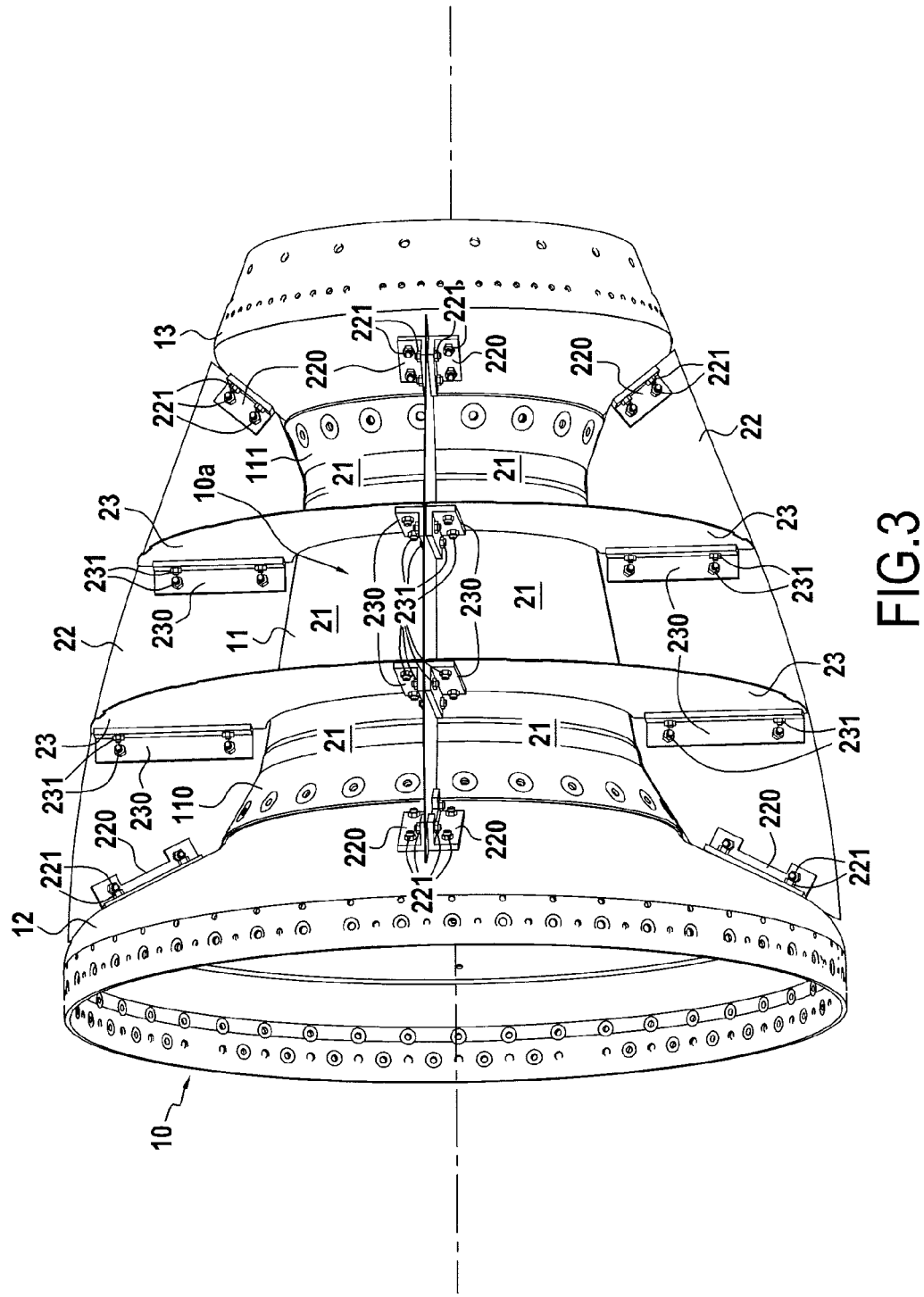
FIG. 3 is a diagrammatic perspective view of the FIG. 2 cone provided with partitions forming acoustic attenuation boxes.

As shown in FIG. 3, the longitudinal partitions 22 are fastened between the upstream and downstream endpieces 12 and 13 by means of angle brackets 220 and nut-and-bolt connection systems 221. The transverse partitions 23 are fastened between the longitudinal partitions 22, likewise by means of angle brackets 230 and nut-and-bolt connection systems 231 so as to define the boxes 21. After or before mounting the partitions, the terminal portion 30 is fastened on the downstream endpiece 13 by bolted connections 33 (FIG. 1).

The set of boxes 21 as formed in this way is then closed in its top portion by means of a multiply-perforated skin 24 that is fastened firstly to the upstream endpiece 12 by rivets 241, and secondly to the downstream endpiece 13 by rivets 242, as shown in FIG. 4.

The terminal portion 30, the partitions 22 and 23, and also the multiply-perforated skin 24 are likewise made of C/C or CMC composite material. These elements are fabricated in a manner that is identical to that described above. Nevertheless, since these elements do not have a structural function, they may be made with much smaller thicknesses than can the parts that constitute the structural core 10. Since the partitions 22 and 23 do not have any structural role, they can be made with very small thickness, e.g. thickness lying in the range 0.7 mm to 1.5 mm. For the multiply-perforated skin 24, the multiple perforations may be made in particular by conventional machining (e.g. drilling with a drill bit), using a jet of water under pressure, or a laser, or indeed by including studs in the fiber reinforcement and removing them with a press after densification. In a variant embodiment, fiber reinforcement may be made with multiple openings, e.g. by weaving a sheet having holes, which holes are not filled in completely during densification so as to form the multiple perforations. In the presently described example, the multiply-perforated skin 24 is made up of a plurality of sectors 240, with the longitudinal edges of two adjacent sectors overlapping, these edges being connected together by rivets 243. Nevertheless, the multiply-perforated skin may also be made as a single piece.

Since the multiply-perforated skin 24 does not have any structural role, it may be of very small thickness, e.g. lying in the range 0.7 mm to 1.5 mm, thereby giving it greater flexibility and making it easier to mount on the exhaust cone.

In general manner, the ratio between the thickness of the structural parts constituting the core and the thickness of the nonstructural parts constituting the acoustic attenuation system lies in the range 3 to 5.

The partitions 22 and 23 and the multiply-perforated skin 24 are preferably made of the same composite material as the material used for fabricating the parts of the structural core 10, such as for example a CMC composite material of the Cerasep® A40C type.

The invention claimed is:

1. An exhaust cone for an aeroengine extending from upstream to downstream along a longitudinal axis,
   said cone comprising a structural core of composite material made up of an axisymmetric part having an upstream endpiece at its upstream end and a downstream endpiece at its downstream end,
   said core providing the structural strength of the cone,
   said cone further comprising an acoustic attenuation system made of composite material and fastened on the structural core;
   wherein the acoustic attenuation system comprises
      longitudinal partitions of composite material fastened to the upstream and downstream endpieces by connection means that are mechanical, and
      transverse partitions of composite material fastened to the longitudinal partitions by connection means that are mechanical, said longitudinal and transverse partitions defining resonator boxes, and
   wherein the ratio of a thickness of structural parts of the core and a thickness of components of the acoustic attenuation system lies in the range of 3 to 5.

2. An exhaust cone according to claim 1, wherein the longitudinal partitions are fastened respectively to the upstream and downstream endpieces by connection means that are mechanical and reversible, and
   in that the transverse partitions are fastened to the longitudinal partitions by connection means that are mechanical and reversible so as to form an assembly that can be dismantled.

3. An exhaust cone according to claim 1, wherein the structural core is made of composite material comprising fiber reinforcement made of refractory fibers densified by a matrix that is at least partially made of ceramic.

4. An exhaust cone according to claim 3, wherein the structural core is made of composite material comprising fiber reinforcement made of silicon carbide fibers densified by a silicon carbide matrix including one or more self-healing phases.

5. An exhaust cone according to claim 1, wherein the longitudinal and transverse partitions present thickness lying in the range 0.7 mm to 1.5 mm.

6. An exhaust cone according to claim 1, wherein the acoustic attenuation system further comprises a multiply-perforated skin of composite material fastened between the upstream endpiece and the downstream endpiece of the core, said multiply-perforated skin closing the top portions of the resonator boxes.

7. An exhaust cone according to claim 6, wherein the multiply-perforated skin presents thickness lying in the range 0.7 mm to 1.5 mm.

8. An exhaust cone according to claim 1, further including a terminal portion of composite material fastened to the downstream endpiece of the structural core.

9. An aeroengine afterbody including an exhaust cone according to claim 1.

\* \* \* \* \*